United States Patent
Sim et al.

(10) Patent No.: US 7,503,532 B2
(45) Date of Patent: Mar. 17, 2009

(54) AUTO-EXPANDABLE BASE FOR FLAT PANEL DISPLAY HEIGHT ADJUSTABLE STAND

(75) Inventors: Tiak Hooy Sim, Singapore (SG); Kok Chin Leong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 161 days.

(21) Appl. No.: 11/365,773

(22) Filed: Mar. 1, 2006

(65) Prior Publication Data

US 2007/0210231 A1    Sep. 13, 2007

(51) Int. Cl.
*A47B 91/00* (2006.01)
*F16M 11/20* (2006.01)

(52) U.S. Cl. ............... 248/188.8; 248/188.1; 248/917; 248/919; 248/920

(58) Field of Classification Search ............. 248/188.6, 248/917–923, 188.8, 346.01, 188.1; 361/681
See application file for complete search history.

(56) References Cited

U.S. PATENT DOCUMENTS

| | | | | |
|---|---|---|---|---|
| 4,449,969 A | * | 5/1984 | Schweizer | 604/322 |
| 4,955,873 A | * | 9/1990 | Rajlevsky | 604/322 |
| 5,102,084 A | * | 4/1992 | Park | 248/286.1 |
| 6,108,195 A | * | 8/2000 | Behl et al. | 361/681 |
| 6,193,208 B1 | * | 2/2001 | Schmitt et al. | 248/688 |
| 6,311,941 B1 | * | 11/2001 | Feldmeyer | 248/188.8 |
| 6,419,198 B1 | * | 7/2002 | Einav | 248/346.07 |
| 2005/0213290 A1 | | 9/2005 | Lauffer et al. | |

* cited by examiner

*Primary Examiner*—Amy J. Sterling
(74) *Attorney, Agent, or Firm*—Haynes and Boone, LLP

(57) ABSTRACT

For stabilizing a stand to mount a display, the stand includes a base support member having a center portion with a circular recess formed about an axis perpendicular to the base support member. A swivel member removably coupled to the center portion is rotatably movable about the axis and within the circular recess. A linking member removably coupled to the center portion, is frictionally coupled to the swivel member. The linking member is rotatably movable in response to a rotational motion of the swivel member. An extensible member extensible member removably coupled to the center portion is frictionally coupled to the linking member. The rotational motion of the swivel member is transferred by the linking member to cause a linear motion of the extensible member. The linear motion of the extensible member increases a virtual base boundary formed by the extensible member and the base support member thereby improving the stability of the stand.

8 Claims, 8 Drawing Sheets

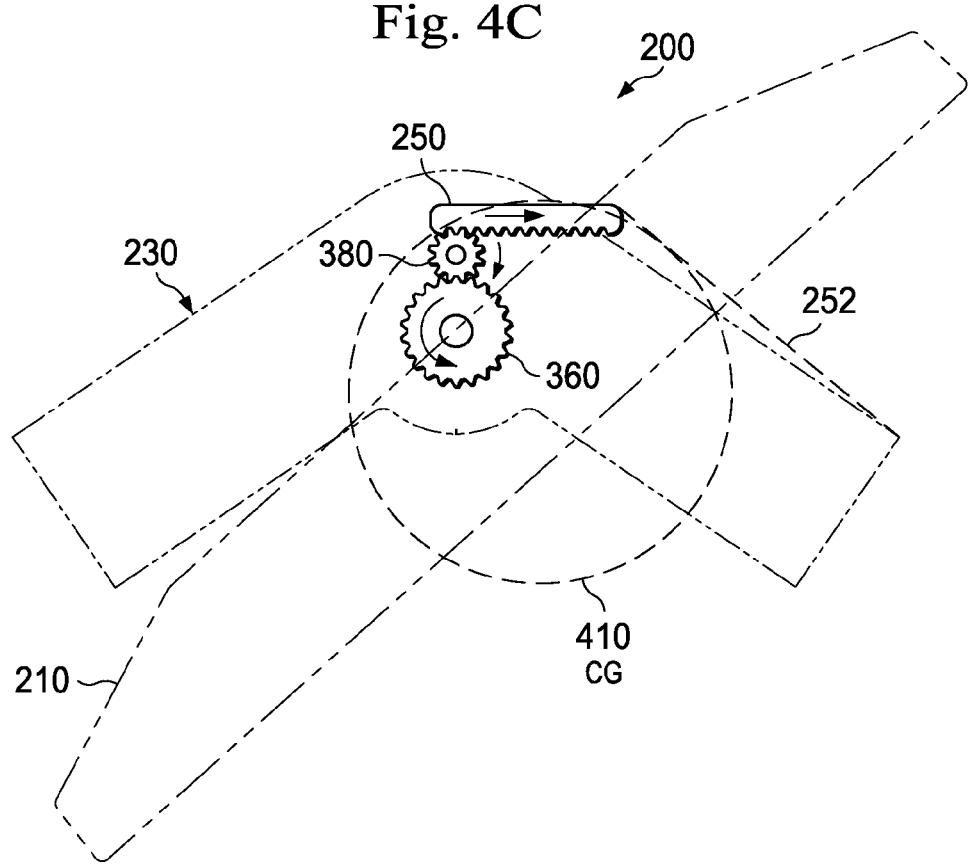

AUTO-EXPANDABLE BASE FOR FLAT PANEL DISPLAY HEIGHT ADJUSTABLE STAND

BACKGROUND

The present disclosure relates generally to display systems, and more particularly to ergonomically enhanced display systems included in information handling systems.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Presently, a variety of display systems may be deployed to display information provided by the IHS and/or by multimedia entertainment devices such as optical media players/recorders, television sets, cable and/or satellite receivers, and similar others. Commonly used display systems may include flat panel displays (FPD's) such as a liquid crystal display (LCD) and/or plasma display panel. The display systems may also include a stand, a mount and/or a support structure for mounting the flat panel display.

Many commercially available stands offer some ergonomic design features such as an adjustable height, tilt and swivel motion for the FPD, thereby enabling the viewer to obtain a desirable viewing angle for the display. However, increased screen sizes, e.g., wide screen monitors, and heavier weights for many FPD's may cause instability of the mounting structure for the FPD. That is, the FPD may tip due to certain viewer adjustments made to the height, tilt and/or swivel angle. As a result, many viewers may not fully benefit from the ergonomic adjustments available with the flat panel due to stability concerns.

Therefore, a need exists to provide for supporting FPD's. More specifically, a need exists to develop tools and techniques for providing a compact base structure operable to accommodate increased screen sizes and weights of the FPD's. Accordingly, it would be desirable to provide an improved support structure to mount FPD's receiving images from an information handling system, absent the disadvantages found in the prior methods discussed above.

SUMMARY

The foregoing need is addressed by the teachings of the present disclosure, which relates to a system and method for providing an improved stand to mount a display. According to one embodiment for stabilizing a stand to mount a display, the stand includes a base support member having a center portion with a circular recess formed about an axis perpendicular to the base support member. A swivel member removably coupled to the center portion is rotatably movable about the axis and within the circular recess. A linking member removably coupled to the center portion, is frictionally coupled to the swivel member. The linking member is rotatably movable in response to a rotational motion of the swivel member. An extensible member removably coupled to the center portion is frictionally coupled to the linking member. The rotational motion of the swivel member is transferred by the linking member to cause a linear motion of the extensible member.

Several advantages are achieved according to the illustrative embodiments presented herein. The embodiments advantageously provide a stand having an improved support structure for mounting devices such as a display and/or an audio speaker. The improved support structure advantageously provides an auto-expandable base to improve the stability of the stand. A center of gravity of the stand with the display is changed when a slope of a working surface supporting the stand is changed. The auto-expandable base advantageously increases a virtual base boundary to maintain the center of gravity within the virtual base boundary in response to an increase in the display rotation and the change in the slope. In addition, the auto-expandable base is compactable for shipping purpose, thereby reducing shipping costs. Thus, ergonomic adjustments made by the viewer such as display panel rotation may be performed safely while automatically providing improved stability of the stand.

BRIEF DESCRIPTION OF THE DRAWINGS

FIGS. 4A, 4B, and 4C are exemplary top plan views of a display station of FIG. 2A, illustrating effect of rotational movement of a flat panel display on a center of gravity, according to an embodiment.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various electrical circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements. Similarly, the functionality of various mechanical elements, members, and/or components for forming modules, sub-assemblies and assemblies assembled in accordance with a structure for an apparatus may be implemented using various materials and coupling techniques, depending on the application requirements.

Many commercially available display stands offer some ergonomic design features such as an adjustable height, tilt and swivel motion for the displays, thereby enabling the viewer to obtain a desirable viewing angle for the display. However, increased screen sizes and weights for many displays may cause instability of the mounting structure for the display. As a result, many viewers may not fully benefit from the ergonomic adjustments available with the flat panel due to stability concerns. Thus, a need exists to provide improved mounting displays.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
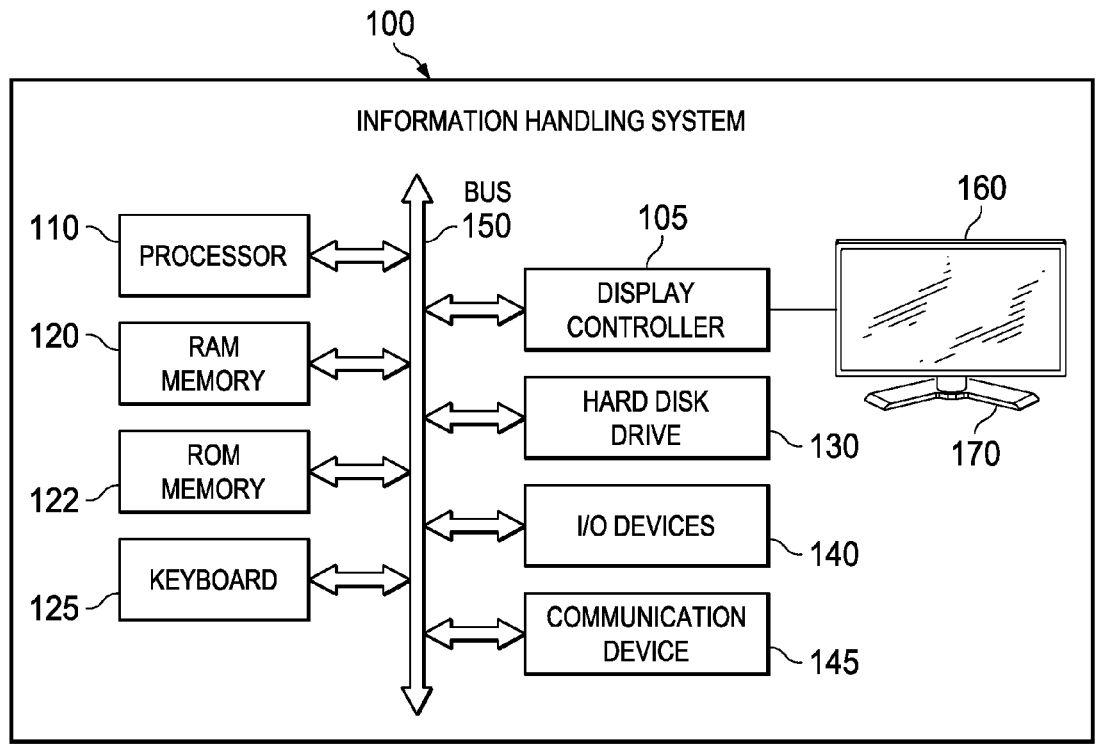
FIG. 1 illustrates a block diagram of an information handling system 100 having a display device mounted on an improved stand, according to an embodiment.

FIG. 1 illustrates a block diagram of an information handling system 100 having a display device mounted on an improved stand, according to an embodiment. The information handling system 100 having the improved display device includes a processor 110, a system random access memory (RAM) 120 (also referred to as main memory), a non-volatile ROM 122 memory, a display controller 105, a keyboard 125 and an I/O controller 140 for controlling various other input/output devices. For example, the I/O controller 140 may include a keyboard controller, a memory storage drive controller and/or the serial I/O controller. It should be understood that the term "information handling system" is intended to encompass any device having a processor that executes instructions from a memory medium.

The IHS 100 is shown to include a hard disk drive 130 connected to the processor 110 although some embodiments may not include the hard disk drive 130. The processor 110 communicates with the system components via a bus 150, which includes data, address and control lines. In one embodiment, the IHS 100 may include multiple instances of the bus 150. A communications device 145, such as a network interface card and/or a radio device, may be connected to the bus 150 to enable wired and/or wireless information exchange between the IHS 100 and other devices (not shown). In an exemplary, non-depicted embodiment, the display controller 105 is coupled to a display device 160 (also simply referred to as a display) to display images. The display 160 may include flat panel display devices such as a liquid crystal display (LCD), plasma display panel, low-cost, dual-scan twisted nematic (DSTN) display, high image quality thin film transistor (TFT) display, field emission display (FED) and similar others. The display 160 is removably mounted on an improved stand 170 (simply referred to as a stand). Additional detail of the stand 170 is described with reference to FIGS. 2A, 2B, 3A and 3B.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. For example, in a particular software program, the processor 110 may direct the display controller 105 to display an image on the display 160. In various embodiments the instructions and/or software programs may be implemented in various ways, including procedure-based techniques, component-based techniques, and/or object-oriented techniques, among others. Specific examples include assembler, C, XML, C++ objects, Java and Microsoft Foundation Classes (MFC).

Figure 2A:
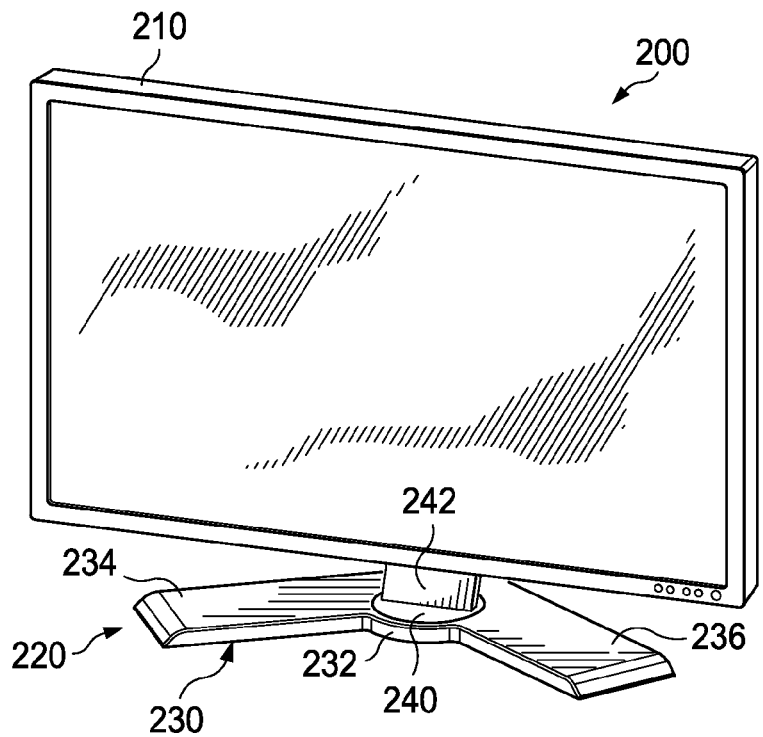
FIG. 2A illustrates a view in perspective of a display station, according to an embodiment.

FIG. 2A illustrates a view in perspective of a display station 200, according to an embodiment. In the depicted embodiment, the display station 200 includes a flat panel display (FPD) 210 mounted on a stand 220. In a particular embodiment, the FPD 210 is substantially the same as the display 160 and the stand 220 is substantially the same as the stand 170 described with reference to FIG. 1. In an exemplary, non-depicted embodiment, the display station 200 is placed on a work surface having a variable incline angle. The incline angle may be unintentional, e.g., due to a non-flat work surface, or may be intentionally adjusted by a user from 0 degrees, e.g., indicating a flat work surface, up to a predefined angle, e.g., 10 degrees, for optimum viewing preference. Additional details of the effect of work surface incline and display rotation of a center of gravity of the display station 200 are described with reference to FIGS. 5A and 5B. In another exemplary, non-depicted embodiment, the stand 220 may be used to mount other peripheral devices such as an audio speaker.

In the depicted embodiment, the stand 220 includes a base support member 230 having a shape that substantially resembles an inverted V. In a particular embodiment, the base support member 230 may be fabricated from a metal such as cast iron, thereby providing improved stability to the stand 220. The base support member 230 is fixed and generally does not move, provided the center of gravity (not shown) of the display system 200 is maintained within a boundary defined by the base support member 230. Additional detail of the effects of rotation of the FPD 210 on the center of gravity of the display station 200 is described with reference to FIGS. 4A, 4B, and 4C.

The base support member 230 includes a center portion 232 disposed between and rigidly coupled to a first leg member 234 and a second leg member 236. The first leg member 234 and the second leg member 236 form a predefined angle at the center portion 232.

In the depicted embodiment, the base support member 230 includes a swivel member 240. The swivel member 240 includes a riser member 242. In an exemplary, non-depicted embodiment, the riser member 242 is removably coupled (e.g., coupled in a removable manner) to the FPD 210. The removable coupling may include well known mechanisms such as snap on to lock and press tab to release. The FPD 210, and hence the swivel member 240, is rotatably movable about an axis (not shown) that is substantially perpendicular to the base support member 230.

Figure 2B:
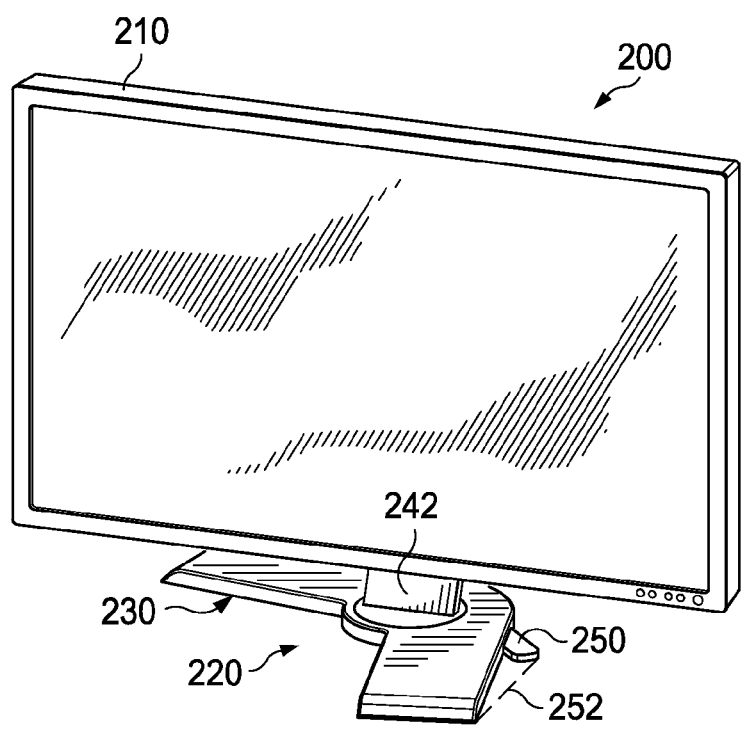
FIG. 2B illustrates a view in perspective of a display station similar to FIG. 2A, but with a flat panel display shown in a swiveled position, according to an embodiment.

FIG. 2B illustrates a view in perspective similar to FIG. 2A, but with the flat panel display of the display station 200 shown in a swiveled position, according to an embodiment. In the depicted embodiment, the FPD 210 is illustrated to be swiveled (or rotated) in an anti-clockwise manner by a predefined angle compared to the non-swiveled position (e.g., swivel angle is 0 degrees) of the FPD 210 described with reference to FIG. 2A. In response to the rotation of the FPD 210, an extensible member 250 is shown to protrude or extend out of the base support member 230. The extensible member 250 is automatically deployed when needed to improve stability. When not deployed, the extensible member 250 is contained within the base support member 230. Thus, the auto-expandable base of the stand 210 is compactable for shipping purpose, thereby reducing shipping costs.

As described earlier, the rotation of the FPD 210 causes the center of gravity of the display station 200 to change. In the depicted embodiment, the extensible member 250 provides improved stability to the display station 200 by increasing a virtual base boundary 252 formed by the extensible member 250 and the base support member 230. Thus, the center of gravity is substantially maintained within the original boundary defined by the base support member 230 and increased by the virtual base boundary 252. Additional details of the extensible member 250 are described with reference to FIGS. 3A and 3B.

Figure 3A:
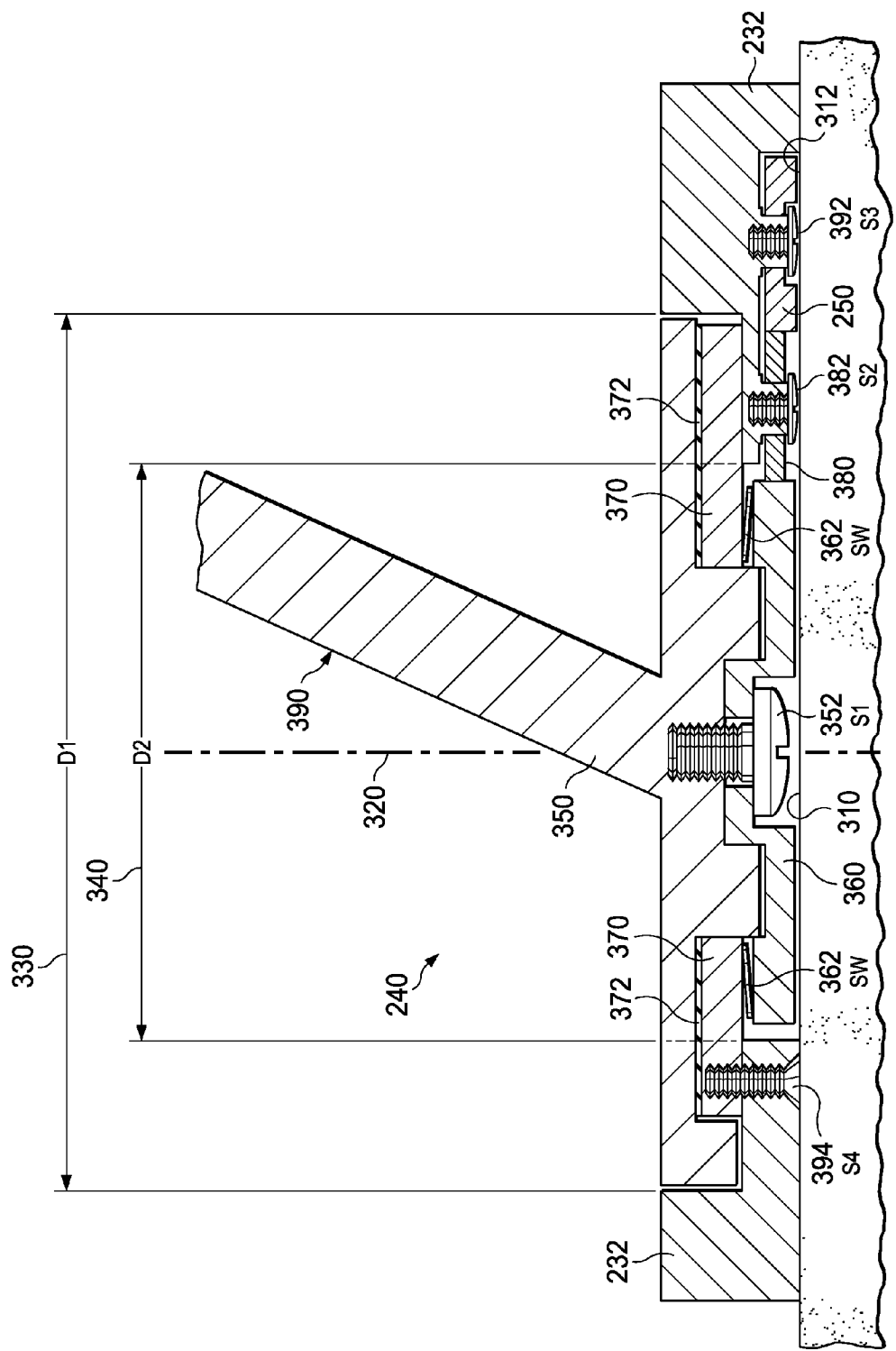
FIG. 3A illustrates a cross sectional view of a base support member of FIG. 2A showing detail of a center portion, according to an embodiment.

FIG. 3A illustrates a cross sectional view of the base support member 230 of the stand 220 of FIG. 2A showing detail of the center portion 232, according to an embodiment. In the depicted embodiment, the center portion 232 is fixed and rests on a work surface 310. The center portion 232 includes a circular recess formed about an axis 320 substantially perpendicular to the base support member 230. The circular recess may be formed in two steps, as a partial circular recess having a diameter D1 330 and a full circular recess having a diameter D2 340. The partial and full circular recesses form a step like platform for supporting the swivel member 240.

The swivel member 240 includes an upper stand riser member 350 and a lower disc holder member 360. In an embodiment, the upper stand riser member 350 is the same as the riser member 242 described with reference to FIG. 2. A fixed disc 370 removably secured to the center portion 232 is disposed in-between the upper stand riser member 350 and the lower disc holder member 360. A friction disc 372 is disposed between the upper stand riser member 350 and the fixed disc 370. In a particular embodiment, a spring washer SW 362 may be placed in-between the fixed disc 370 and the lower disc member 360. In this embodiment, the spring washer controls the pressure on the friction disc 372 to achieve desired swiveling torque. In the depicted embodiment, the upper stand riser member 350 and the lower disc holder member 360 are removably secured together, and thereby to the fixed disc 370, by a screw S1 352. The swivel member 240 is removably coupled to the center portion 232 by a screw S4 394. Additional detail of the removable coupling between the center portion 232 and the swivel member 240 is described with reference to FIG. 3B. The swivel member 240 is rotatably movable about the axis 320 and within the circular recess.

In the depicted embodiment, a linking member 380 is removably coupled to the center portion 232 by a screw S2 382. The linking member 380 is also frictionally coupled to the lower disc holder member 360 of the swivel member 240, whereby the linking member 380 is rotatably movable in response to a rotational motion of the swivel member 240, and hence the FPD 210 (not shown). The extensible member 250 is removably coupled to the center portion 232 by a screw S3 392. The extensible member 250 is frictionally coupled to the linking member 380, whereby the rotational motion of the swivel member 240 is transferred by the linking member 380 to cause a linear motion of the extensible member 250, as described with reference to FIG. 2B.

In the depicted embodiment, the extensible member 250 is separated from the work surface 310 by a predefined gap 312. In an exemplary, non-depicted embodiment, a base portion of the extensible member 250 may be fitted with a friction reducing material to be in direct contact with the work surface 310. In another embodiment, the base portion of the extensible member 250 may be fitted with wheels and/or ball bearings to reduce the friction with the work surface 310.

In an exemplary, non-depicted embodiment, the frictional coupling between the lower disc holder member 360 and the linking member 380, and between the linking member 380 and the extensible member 250 is implemented using a gear assembly. In this embodiment, the lower disc holder member 360 and the linking member 380 each have an interlocking set of matching teeth formed around their peripheries. The linking member 380 may be described as an idler gear to transfer the rotational motion from the swivel member 240 to the extensible member 250. The extensible member 250 may include a rack and pinion type gear to translate the rotational motion to a linear motion.

Figure 3B:
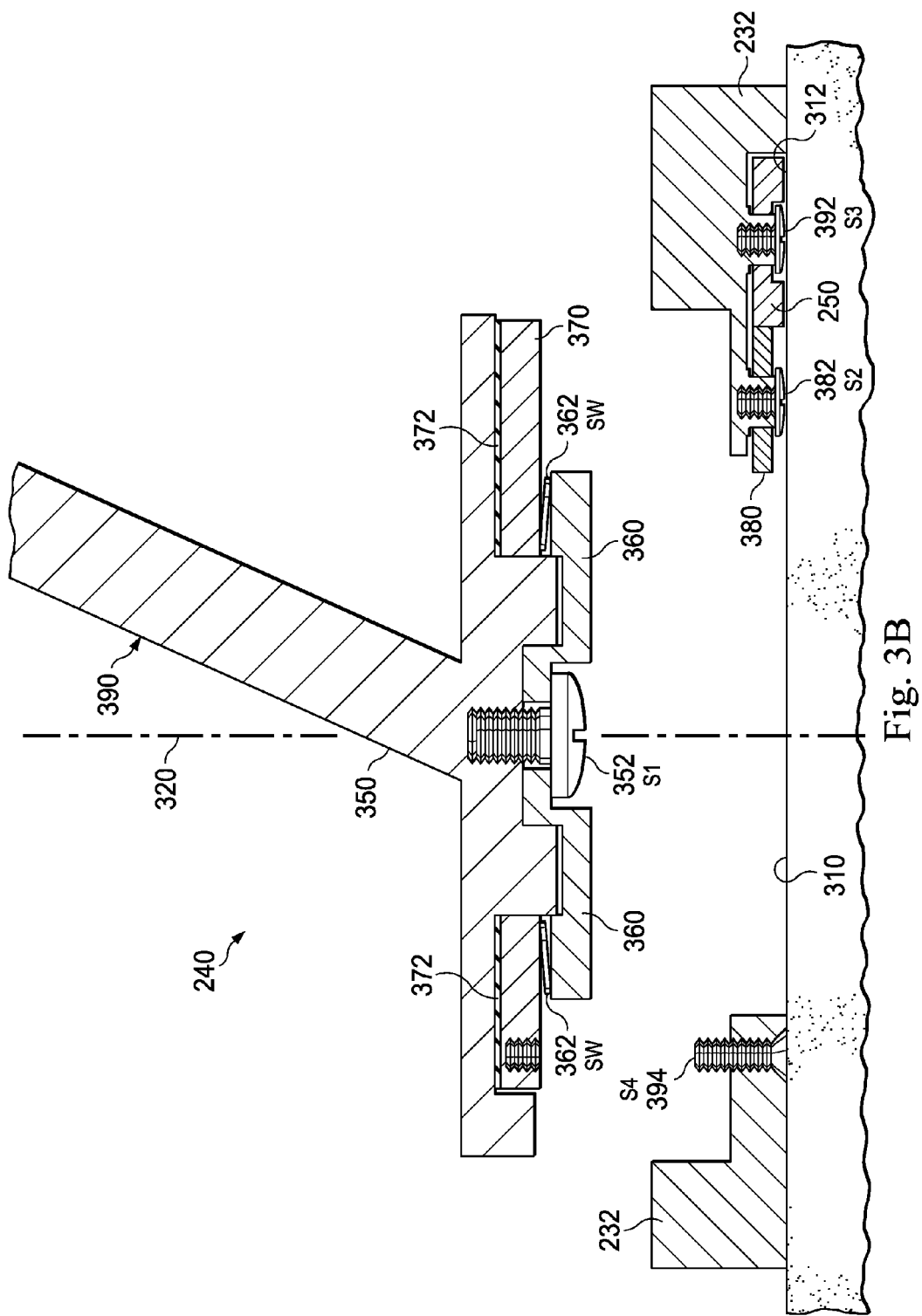
FIG. 3B illustrates a technique to removably couple a center portion of a base support member and a swivel member of FIG. 3A, according to an embodiment.

FIG. 3B illustrates a technique to removably couple the center portion 232 of the base support member 230 and the swivel member 240 of FIG. 3A, according to an embodiment. In the depicted embodiment, a sub-assembly 390 is formed to fabricate the swivel member 240 by assembling the upper stand riser member 350, the lower disc holder member 360 and the fixed disc 370 by the screw S1 352. In the depicted embodiment, the friction disc 372 is disposed between the upper stand riser member 350 and the fixed disc 370. In an embodiment, the spring washer SW 362 may be placed in-between the fixed disc 370 and the lower disc member 360. In this embodiment, the spring washer controls the pressure on the friction disc 372 to achieve desired swiveling torque. In the depicted embodiment, the sub-assembly 390 is removably coupled to the center portion 232 by the screw S4 394.

Figure 4A:
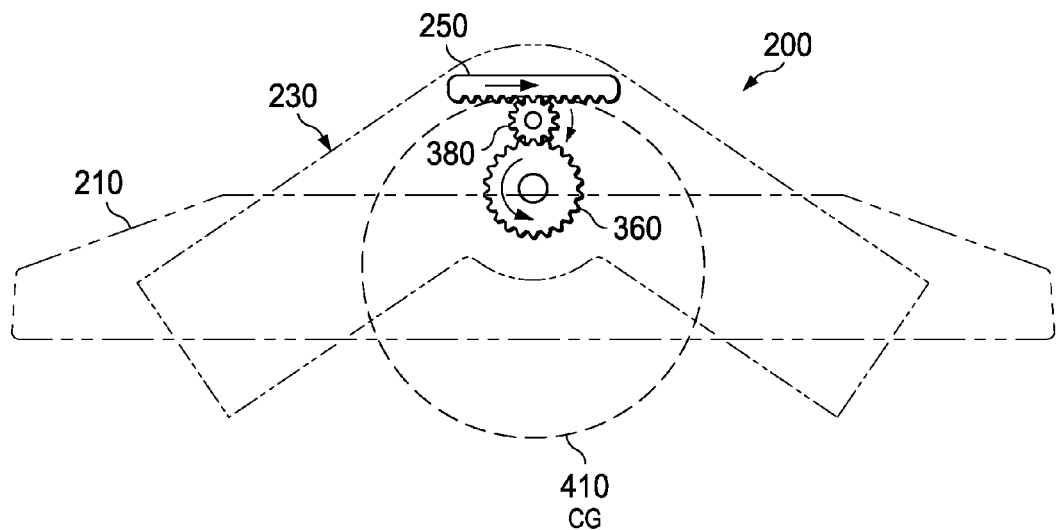
Figure 4B:
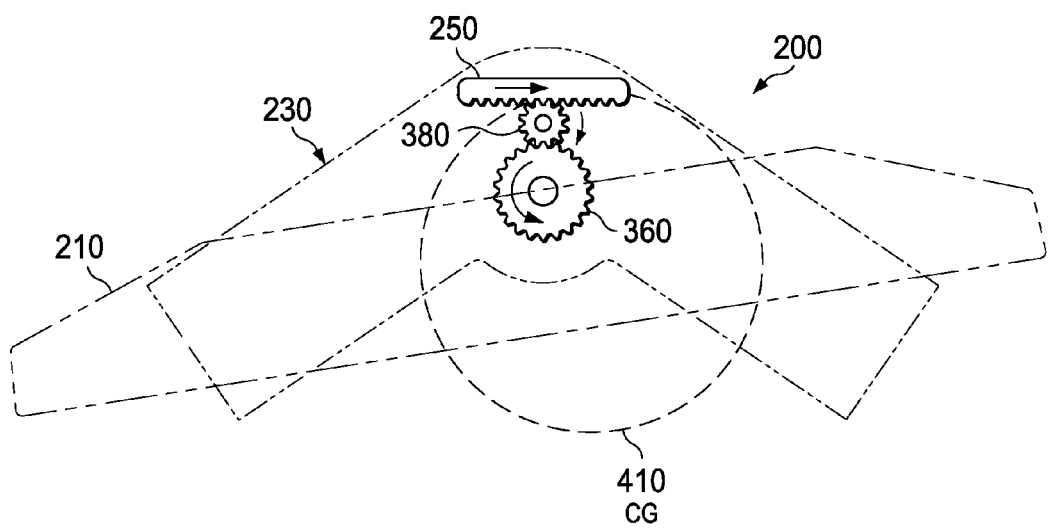

FIGS. 4A, 4B, and 4C are exemplary top plan views of the display station 200 shown in FIG. 2, illustrating effect of the rotational movement of the FPD 210 on a center of gravity, according to an embodiment. FIG. 4A illustrates a top plan view of the display station 200 when the FPD 210 is not swiveled or rotated, according to an embodiment. That is, when the swivel angle is substantially equal to 0 degrees. In this embodiment, a center of gravity of the display station 200 lies within a circle CG 410. That is, the stand 210 is stable because the center of gravity falls within the boundary defined by the base support member 230. The extensible member 250 is substantially contained within the base support member 230 when the swivel angle is substantially equal to 0 degrees.

FIG. 4B illustrates a top plan view of the display station 200 when the FPD 210 is swiveled or rotated by a first swivel angle, according to an embodiment. That is, when the swivel angle is substantially equal to a first predefined angle. In this embodiment, a center of gravity of the display station 200 lies within the circle CG 410, which has shifted to the right compared to the CG 410 described with reference to FIG. 4A, corresponding to a counter-clockwise motion of the FPD 210. The stand 210 is stable because the center of gravity falls within the boundary defined by the base support member 230.

The extensible member 250 is substantially contained within the base support member 230 when the swivel angle is substantially equal to 0 degrees and not greater than the first predefined angle.

FIG. 4C illustrates a top plan view of the display station 200 when the FPD 210 is swiveled or rotated by a second swivel angle, according to an embodiment. That is, when the swivel angle is substantially equal to a second predefined angle. In this embodiment, a center of gravity of the display station 200 lies within the circle CG 410, which has shifted to the right compared to the CG 410 described with reference to FIG. 4B, corresponding to a counter-clockwise motion of the FPD 210. The stand 210 is stable due to the protrusion of the extensible member 250 beyond the boundary of the base support member 230. As described previously, the extension of the extensible member 250 advantageously provides an increased virtual base boundary 252 formed by the extensible member 250 and the base support member 230. The CG 410 falls within the increased virtual base boundary 252 and the boundary defined by the base support member 230.

Figure 5A:
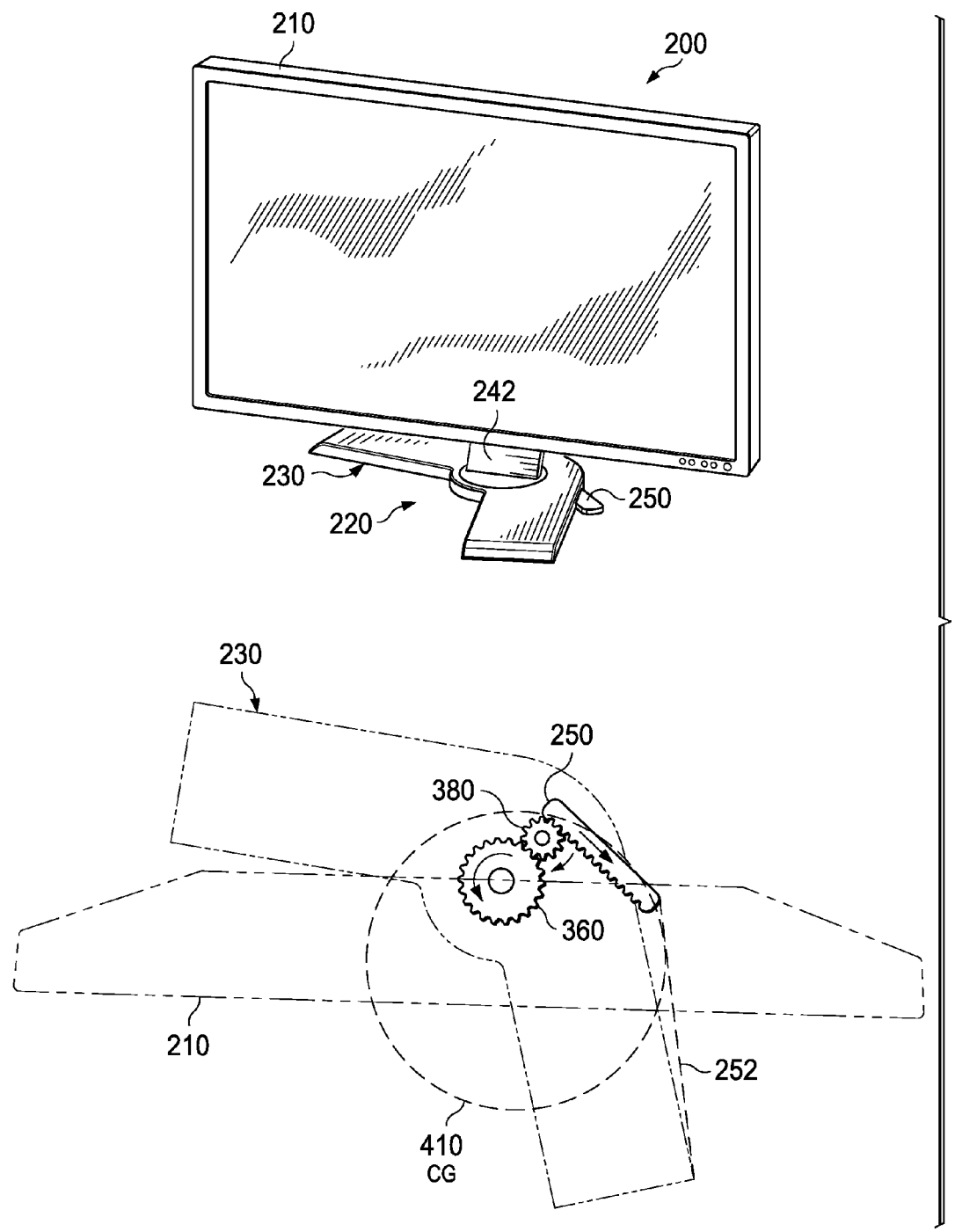
FIGS. 5A and 5B are isometric views and corresponding top plan views of a display station of FIG. 2A, illustrating effect of a change in an incline angle of a work surface on a center of gravity, according to an embodiment.
Figure 5B:
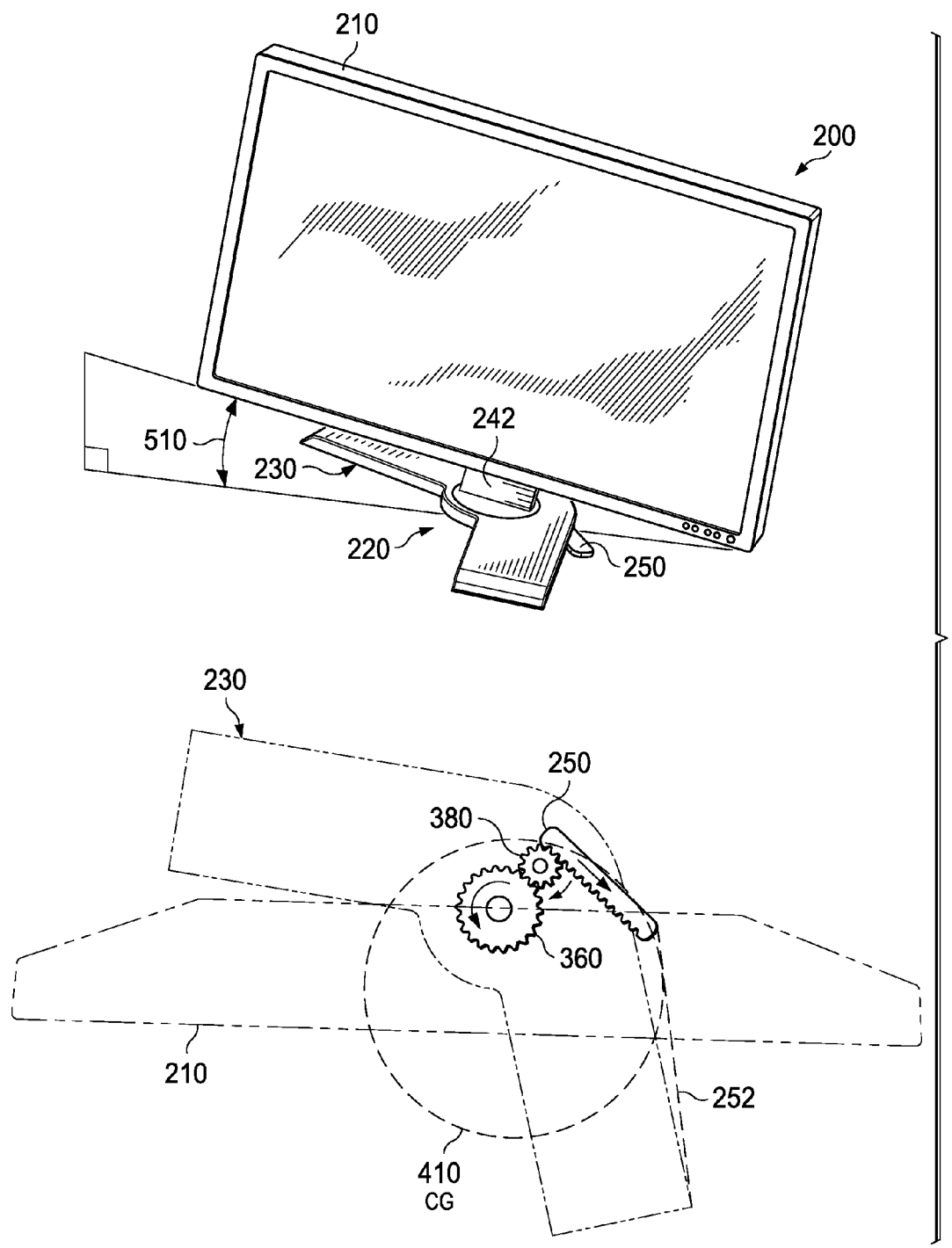

FIGS. 5A and 5B are isometric views and corresponding top plan views of the display station 200 shown in FIG. 2, illustrating effect of a change in the incline angle of the work surface 310 on a center of gravity, according to an embodiment. FIG. 5A illustrates an isometric view of the display station 200 in a swiveled position and the corresponding top plan view, according to an embodiment. In the depicted embodiment, the work surface 310 (not shown) is flat. That is, an incline angle of the work surface 310 is substantially equal to 0 degrees. In response to the FPD 210 being swiveled beyond a predefined angle, the extensible member 250 extends beyond the boundary of the base support member 230, thereby providing the virtual base boundary 252.

FIG. 5B illustrates an isometric view of the display station 200 placed on an inclined work surface 310 and the FPD 210 in a swiveled position and the corresponding top plan view, according to an embodiment. In the depicted embodiment, the work surface 310 is inclined at a predefined incline angle 510. In a particular embodiment, the predefined incline angle is defined to be substantially equal to 10 degrees. In response to the FPD 210 being swiveled beyond a predefined angle, the extensible member 250 extends beyond the boundary of the base support member 230, thereby providing the virtual base boundary 252. In a particular embodiment, the virtual base boundary is extended when the extensible member 250 makes physical contact with the work surface 310. In the depicted embodiment, the stand 220 maintains stability under a combination of the work surface 310 being inclined and the FPD 210 being swiveled beyond a predefined angle, since the CG 410 falls within the increased virtual base boundary 252 and the boundary defined by the base support member 230.

Figure 6:
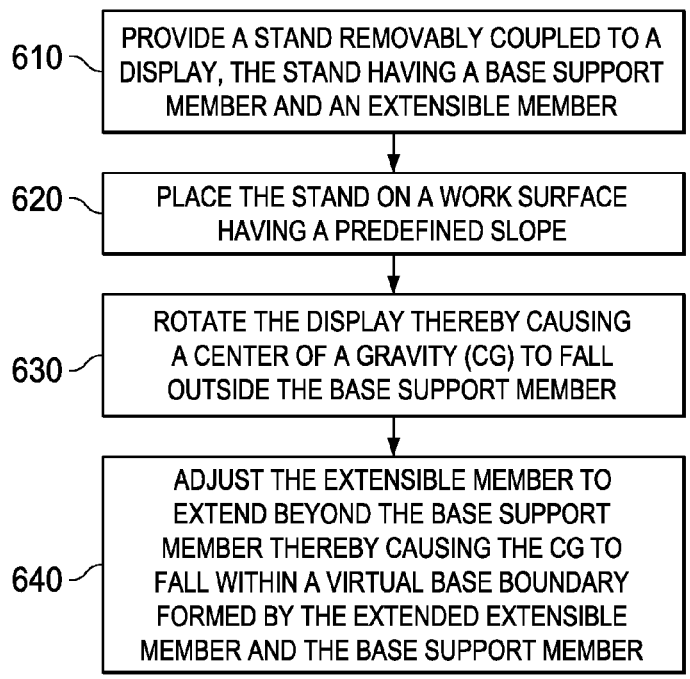
FIG. 6 is a flow chart illustrating a method for stabilizing a stand removably coupled to a display.

FIG. 6 is a flow chart illustrating a method for stabilizing a stand removably coupled to a display. In a particular embodiment, the stand is substantially the same as the stand 210 and the display is substantially the same as the FPD 220 described with reference to FIG. 2A. In step 610, the stand having a base support member and an extensible member removably coupled thereto is provided. The extensible member is operable to be extended beyond a boundary of the base support member. In step 620, the stand is placed on a work surface having a predefined slope. In step 630, the display is rotated thereby causing a center of gravity of the stand with the display to fall outside the base support member. In step 640, in response to the rotation of the display, the extensible member is adjusted by extending the extensible member beyond the boundary of the base support member, thereby causing the center of gravity to fall within a virtual base boundary formed by the extensible member in the adjusted position and the base support member.

Various steps described above may be added, omitted, combined, altered, or performed in different orders. For example the step 630 may be omitted by providing the stand in step 610 with a pre-rotated display prior to placing the stand on the work surface.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. Accordingly, it is appropriate that the appended claims be construed broadly and in a manner consistent with the scope of the embodiments disclosed herein.

What is claimed is:

1. An information handling system (IHS) comprising:
   a processor;
   a display coupled to the processor;
   a base having a chevron shape and being coupled to the display by a movable coupling including:
      a stand to removably mount the display, wherein the stand includes:
         a swivel member including a first gear; and
         a rack and pinion gear assembly interlocked with the first gear, the rack being an extensible member movable to extend from the base, whereby a swivel movement of the display, moves the swivel member and the first gear, and in response, the rack and pinion assembly are automatically moved such that the extensible member extends from the base.

2. The system of claim 1, wherein the swivel member includes a resilient member.

3. An information handling system (IHS) comprising:
   a processor;
   a display coupled to the processor;
   a base having a chevron shape and being coupled to the display by a moveable coupling including:
      a stand to removably mount the display, wherein the stand includes:
         a swivel member including a first gear and a spring washer; and
         a rack and pinion gear assembly interlocked with the first gear, the rack being an extensible member movable to extend from the base, whereby a swivel movement of the display, moves the swivel member and the first gear, and in response, the rack and pinion assembly are automatically moved such that the extensible member extends from the base.

4. The system of claim 3, wherein the display is a flat panel display.

5. The system of claim 3, wherein the swivel movement of the display in a first direction extends the extensible member linearly in the first direction.

6. The system of claim 3, wherein the swivel member is connected to the display by a riser member.

7. The system of claim 3, wherein the swivel member includes a riser member fixedly coupled to swivel with the first gear.

8. The system of claim 3, wherein the extensible member extends in a direction corresponding to the direction of movement of the display.

* * * * *

UNITED STATES PATENT AND TRADEMARK OFFICE
CERTIFICATE OF CORRECTION

PATENT NO. : 7,503,532 B2  Page 1 of 1
APPLICATION NO. : 11/365773
DATED : March 17, 2009
INVENTOR(S) : Tiak Hooy Sim et al.

It is certified that error appears in the above-identified patent and that said Letters Patent is hereby corrected as shown below:

Title Page; item (57);
Abstract; Fourth Sentence: after the word member, delete "extensible member".

Specification; Paragraph [0036]; Lines 5-7" delete "angie" and insert --angle--.

Signed and Sealed this

Twenty-fifth Day of August, 2009

David J. Kappos
*Director of the United States Patent and Trademark Office*